March 13, 1962 R. C. SIEBERT 3,025,066

TURNTABLE

Filed Jan. 26, 1959 3 Sheets-Sheet 1

INVENTOR.
RAYMOND C. SIEBERT
BY Frank E. Robbins
ATTORNEY

March 13, 1962

R. C. SIEBERT 3,025,066

TURNTABLE

Filed Jan. 26, 1959

3 Sheets-Sheet 2

INVENTOR.
RAYMOND C. SIEBERT

BY Frank E. Robbins

ATTORNEY

March 13, 1962 R. C. SIEBERT 3,025,066

TURNTABLE

Filed Jan. 26, 1959

3 Sheets-Sheet 3

INVENTOR.
RAYMOND C. SIEBERT

BY Frank E. Robbins

ATTORNEY

United States Patent Office 3,025,066

Patented Mar. 13, 1962

3,025,066
TURNTABLE

Raymond C. Siebert, Avon, N.Y., assignor, by mesne assignments, to General Dynamics Corporation, Rochester, N.Y., a corporation of Delaware Filed Jan. 26, 1959, Ser. No. 789,173
9 Claims. (Cl. 274—39)

This invention relates to a turntable for a high fidelity phonograph reproduction system.

The performance of a turntable is judged on the basis of many interrelated factors. For example, the accuracy of rotational speed is important, and must be independent of the power source, which may be alternating current, generated direct current, direct current from batteries, etc. For flexibility, there usually is some mechanism that permits operation of the turntable at any one of four different speeds, namely 16⅔, 33⅓, 45 and 78 r.p.m. At each of these speeds, moreover, speed accuracy must be maintained. Speed accuracy is expected in spite of the fact that the usual source of alternating current provides power that varies in voltage.

In addition, the reproduction system should operate with a minimum of rumble, wow and flutter. To minimize rumble, the turntable itself should be insulated against vibrations from the motor, and as well, from the general environment; and the tone arm must also be free from vibrations from the motor and from the general environment. Moreover, the tone arm must be mounted to track in the grooves on a record on the turntable accurately, with very light pressure against the groove surfaces, and with a minimum amount of friction or drag.

Many of the turntables that are now available are driven by constant speed motors; and turntable speed changes are effected mechanically, with step-pulleys, gears, rubber wheels, cams, and the like. One type of variable speed turntable drive is described, for example, in my United States Patent 2,818,741, granted to me on January 7, 1958, in which the drive employed a multi-step motor shaft that was adapted to drive the turntable through a pair of idler wheels, at any of a plurality of different rotational speeds. In that drive, as in most strictly mechanical drives, the motor and turntable are mounted from a common support, and therefore, motor vibration is transmitted mechanically to the turntable. Damping devices are not completely effective for eliminating this motor vibration. Furthermore, to minimize vibration, drives of this type require the use of expensive motors, that can maintain a constant speed despite voltage fluctuations at the power source.

Recently, expensive electronic control regulating devices have been employed that permit speed selection at any one of a plurality of different speeds, and that maintain speed accuracy at each selected speed, despite variations in power line voltage and frequency. In one device of this type, a variable frequency, voltage-regulated oscillator amplifier is employed to provide an output current to drive a motor at any one of four frequencies. The motor pulley is coupled to the turntable through belts and drive pulleys. The motor is supported on vibration resistant mats on the same support plate on which the turntable is supported. This type of drive assembly is expensive, and does not eliminate all the motor vibrations from the turntable.

Moreover, in both of the hitherto-available drives that are described briefly above, the turntable must be operated at one of the preselected plurality of operating speeds. In many cases, however, the turntable user may desire to use the turntable at a speed other than one of the preselected speeds, and with these drives, is unable to do so. For example, a square dance caller who is using recorded music often wishes to set the tempo to a relatively low level for beginning dancers, and to the standard tempo, or even faster, for advanced dancers. This type of speed adjustment is not possible with drives of the type described above.

There are some drives that are available that permit adjustment of the speed of turntable rotation. However, the ability to adjust turntable speed is usually obtained by a sacrifice in one or more of the other factors by which performance is judged.

One object of the present invention is to provide a turntable assembly for a phonograph that delivers superior performance, yet that is relatively inexpensive to construct.

Another object of the invention is to provide an inexpensive turntable assembly for a phonograph that will permit infinite adjustment of the speed of the turntable, within its speed range, yet that uses an inexpensive motor.

Another object of the invention is to provide a turntable assembly for a phonograph that can be operated at any one of a plurality of preselected speeds with a high degree of accuracy, and that also permits an infinite adjustment of turntable speed within its speed range.

Another object of the invention is to provide a turntable assembly for a phonograph in which the tone arm and turntable are isolated from the motor and are free from motor vibration.

A related object of the invention is to provide a turntable assembly for a phonograph in which the turntable and tone arm are substantially isolated from their general environment and hence are substantially free from environmental vibration.

Another object of the invention is to provide a turntable assembly of the character described, in which the accuracy of any selected speed is excellent and is easily adjusted to correct for the usual variations in power line voltage.

Still another object of the invention is to provide an inexpensive turntable assembly that has superior characteristics as to rumble, wow and flutter.

Other objects of the invention will be apparent hereinafter from the specification and from the recital of the appended claims.

Figure 1:
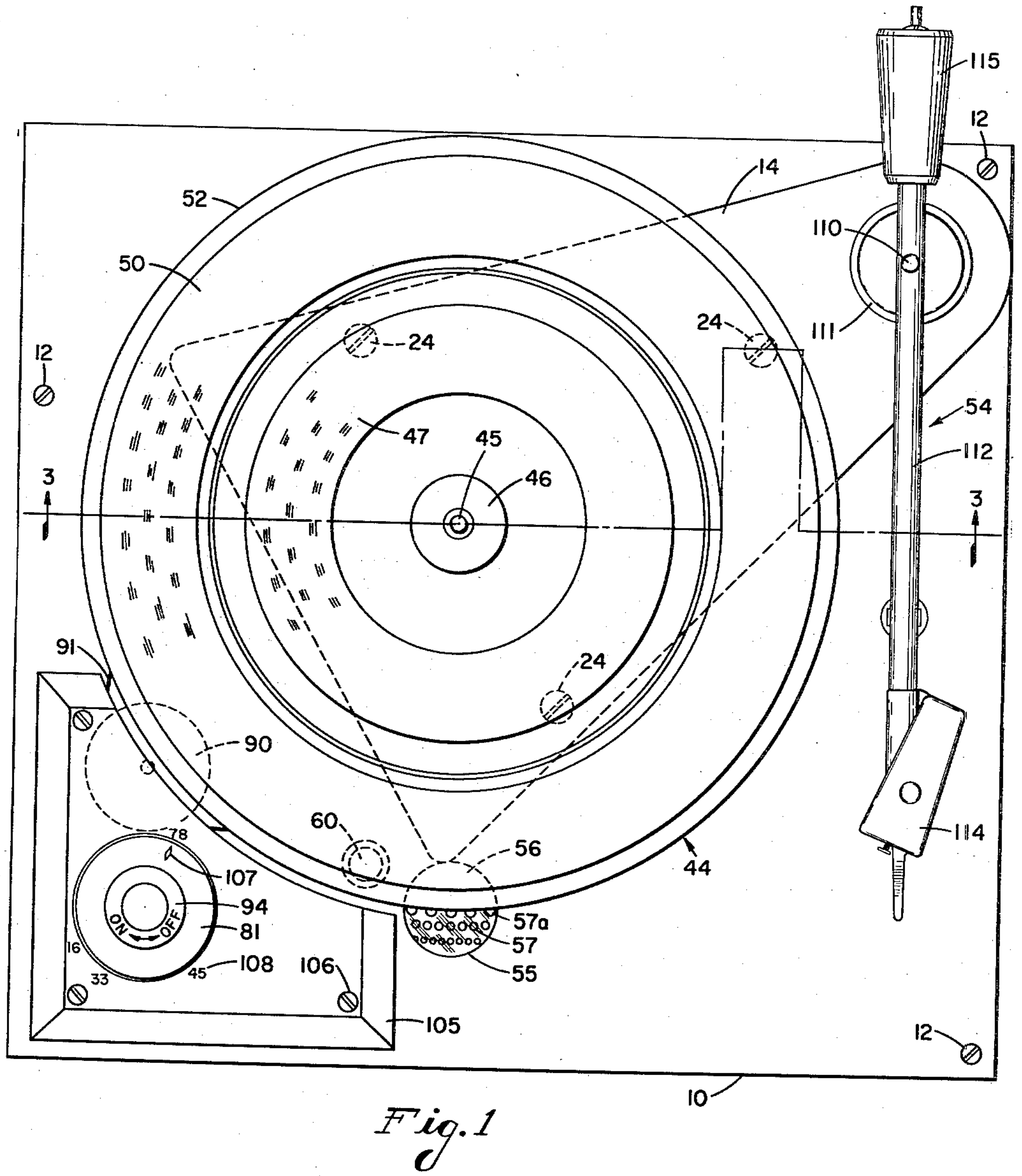
FIG. 1 is a top plan view of a turntable assembly, including a tone arm, constructed according to one embodiment of this invention.
Figures 3, 3A:
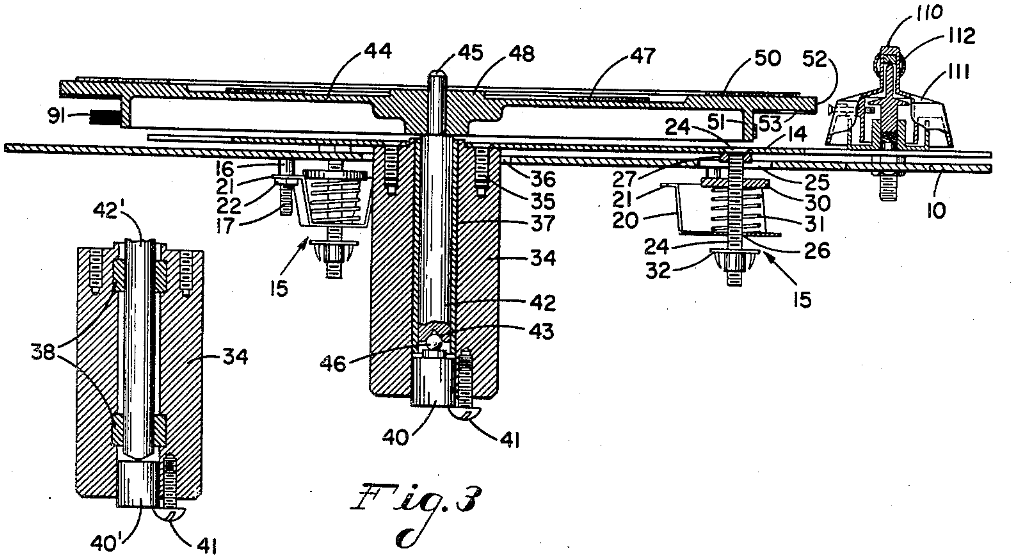
FIG. 3 is a section taken substantially one the line 3—3 of FIG. 1, looking in the direction of the arrows.
Figures 4, 5:
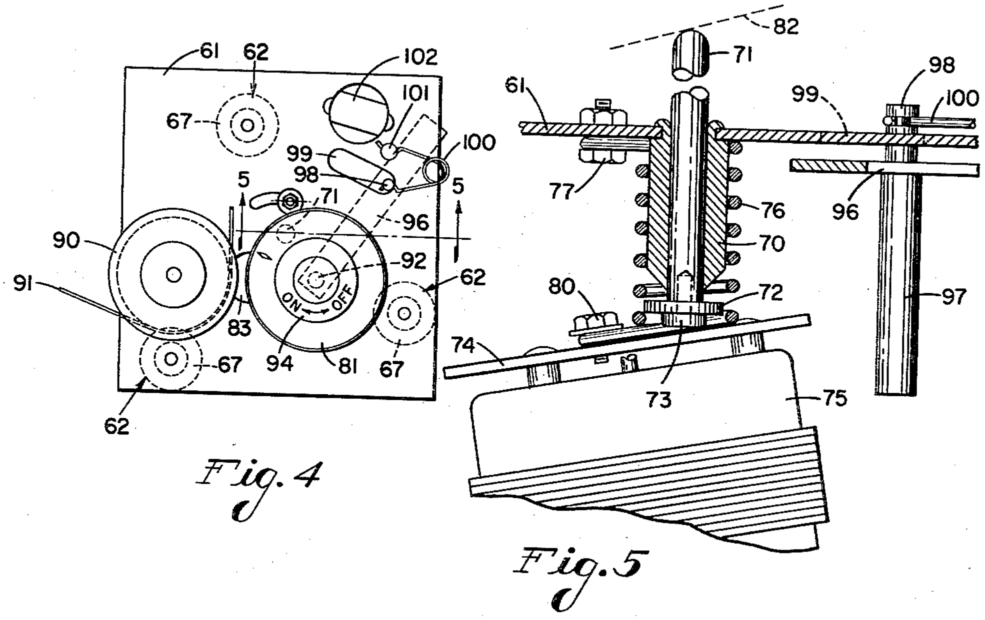
Figure 6:
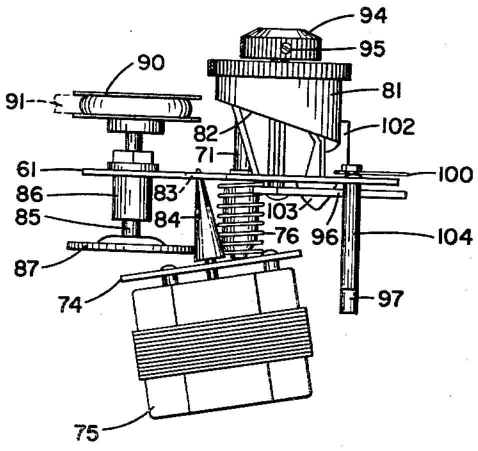
Figure 7:
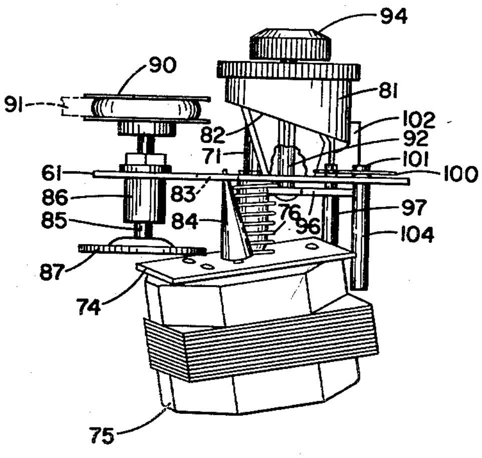

FIG. 3*a* is a fragmentary section, taken on substantially the same line as FIG. 3 and looking in the same direction, of a modified embodiment of the invention;

FIG. 4 is a top plan view of the drive assembly mounting plate, with the cover removed, and rotated 90° in a counterclockwise direction from its position in FIG. 1;

FIG. 5 is a fragmentary section, on an enlarged scale, taken on the line 5—5 of FIG. 4, looking in the direction of the arrows, and showing the cam surface by a dotted line;

FIG. 6 is a side elevation of the drive assembly mounting plate shown in FIG. 4, showing the drive assembly for the turntable in driving position for rotating the turntable at high speed, and FIG. 7 is a side elevation thereof showing the drive assembly in inoperative position.

According to my invention, I provide a chassis plate or motor board that supports a mounting plate for the turntable and tone arm, and that also independently supports a drive assembly plate from which the motor and variable speed drive assembly for the turntable are mounted. The turntable and tone arm mounting plate, and the drive assembly mounting plate, are supported in resilient manner from the chassis so that mechanical vibrations from the motor and from the variable speed drive assembly are not transmitted to the turntable and vice versa, and so that the turntable and tone arm can operate with substantial freedom from mechanical shock from the general environment.

The turntable and tone arm mounting plate and the drive assembly mounting plate float freely above and below the chassis, respectively, isolated from vibration. A variable speed drive is mounted on the drive assembly mounting plate, to drive the turntable from the motor, and is infinitely adjustable, within its range of speeds, to obtain any desired turntable speed with a high degree of accuracy. The speed adjustment is obtained within the drive assembly itself, and not through preset mechanical or electronic means, and therefore the electric motor that is employed can be a very inexpensive motor.

Referring now to the drawings by numerals of reference, 10 denotes the rectangular chassis plate from which all the other parts of my mechanism are supported. The chassis 10 preferably is supported on three legs 11 that are secured to the chassis by screws 12.

The turntable and tone arm mounting plate 14 is suspended above the chassis 10 on three spring suspensions 15. Each spring suspension has substantially the same construction, as follows: A pair of threaded bushings 16 are welded or otherwise secured to the undersurface of the chassis 10, and rods 17 are threaded into the bushings 16 respectively. A generally U-shaped bracket 20 of sheet metal, that has a pair of centrally perforated wings 21 projecting respectively from each of its upper ends, is mounted on the rods 17, with the rods 17 passing through perforations in its wings. A pair of nuts 22 are threaded on the rods 17 respectively to hold the wings 21 against the bushings 16. A stove bolt 24 is engaged in a recess in the turntable and tone arm mounting plate 14 and projects through an opening 25 in the chassis 10 and through another opening 26 in the bottom web of the bracket 20. A nut 27 is threaded on the shank of the bolt 24 and secures the bolt 24 to the turntable and tone arm mounting plate 14 with the head of the bolt flush with the upper surface of the turntable and tone arm mounting plate. A threaded disc 30 is threaded on the shank of the bolt 24 intermediate its ends, and a coil spring 31 is interposed between the disc 30 and the web of the bracket 20. A nut 32 is threaded on the lower end of the bolt 24.

To adjust the elevation of the turntable and tone arm mounting plate 14 above the chassis 10, to place the turntable and tone arm mounting plate in operating condition, each of the spring suspensions 15 is adjusted in the following manner. The nut 32 is backed off to the lower end of the bolt 24. The disc 30 is then rotated in the proper direction to raise or to lower the bolt 24 and the platform 14, as necessary. The springs 31 should carry the entire weight of the turntable and tone arm mounting plate 14. The nuts 32 can be engaged against the lower face of the web of the bracket 20, when the assembly is to be transported, to minimize the effect of mechanical shock on the assembly.

A thick-walled, heavy metal cylinder 34 is suspended from the turntable and tone arm mounting plate 14 by a plurality of screws 35. The bore of the cylinder 34 is aligned with an opening in the turntable and tone arm mounting plate 14. The cylinder 34 projects through an aperture 36 in the chassis 10. A sleeve 37 lines the bore of the cylinder 34. A plug 40 of polytetrafluoroethylene is disposed at the lower end of the bore of the cylinder 34, and is adjustably held in the bore by a screw 41. To adjust the position of the plug 40 in the bore, the screw 41 is threaded into and out of a threaded axially-extending bore in the wall of the cylinder 34.

The spindle 42 of the turntable 44 is journalled in the sleeve 37. The spindle 42 has a conical seat 43 at its lower end and a steel ball 46 is interposed between the conical seat 43 and the upper surface of the plastic plug 40. The steel ball 46 acts as a thrust bearing and carries the weight of the turntable 44 and its spindle 42.

Referring briefly to FIG. 3*a*, instead of using a sleeve 37 in the bore of the cylinder 34, we can employ a pair of sintered bronze sleeve bearings 38 that are spaced axially of the bore. The spindle 42' is formed with a conical end that engages against the upper, flat surface of a plug 40', in substantially point contact.

The turntable 44 is formed with a record spindle 45 that projects from its upper surface, and is also formed with a boss 48, that is concentric with the spindle 45, and is adapted to engage in records that have large central apertures, such as, for example, the current 45 r.p.m. records. The turntable 44 has two concentric, cork-covered record support surfaces at different elevations. The lower surface 47 cooperates with the boss 48 for playing 45 r.p.m. records, and the upper surface 50 cooperates with the spindle 45 for playing other records. The turntable 44 is also formed with a downwardly depending, generally cylindrical flange 51 that is disposed inwardly of the outer peripheral surface 52 of the turntable. The turntable is relatively massive, and a large part of its mass is concentrated adjacent its periphery, to provide a flywheel effect.

A tone arm 54 is supported on a pedestal that is secured at one end of the turntable and tone arm mounting plate 14.

On the flat undersurface of the turntable 44, between the flange 51 and the circumference 52 of the turntable, an indicia-bearing cardboard disc 53 is secured. The chassis 10 is formed with a generally circular aperture 55 (FIG. 1), approximately one half of which is disposed beneath the cardboard 54, and the remainder of which is disposed outwardly of the turntable. A mirror 56 (FIGS. 1 and 2) is secured to the chassis 10 directly beneath the opening 55, and a neon stroboscopic lamp 60 (FIG. 1) is mounted on the chassis 10 adjacent the opening 55, to cast stroboscopic light on the indicia 57 on the disc 53 to permit the operator of the turntable to view the reflection therein of the indicia 57 on the cardboard disc 53 by stroboscopic light. The indicia 57 comprise several concentric circles, each of which is made up of a series of spaced dots. The dots in the different circles are, respectively, of different sizes. The spacing of the dots is prearranged to cooperate with the timing of the stroboscopic lamp 60, so that at certain preselected speeds, a corresponding one of the several respective circles of dots will appear to be stationary when viewed in the stroboscopic light. For example, the dots in the innermost circle of large dots **57*a*** (FIG. 1) may be so spaced from each other that under stroboscopic light at 120 flashes per second, these dots appear to be stationary. Moreover, when viewing the turntable from above as in FIG. 1, as the turntable is rotated in a clockwise direction, at speeds slightly slower than 78 r.p.m., the dots will appear to move in a counter-clockwise direction; and at speeds above 78 r.p.m., these dots will appear to move in a clockwise direction. Other circles of dots can be arranged in a predetermined spacing to indicate respectively speeds of 45 r.p.m., 33⅓ r.p.m. and 16⅔ r.p.m., or any other desired turntable speeds.

Figure 2:
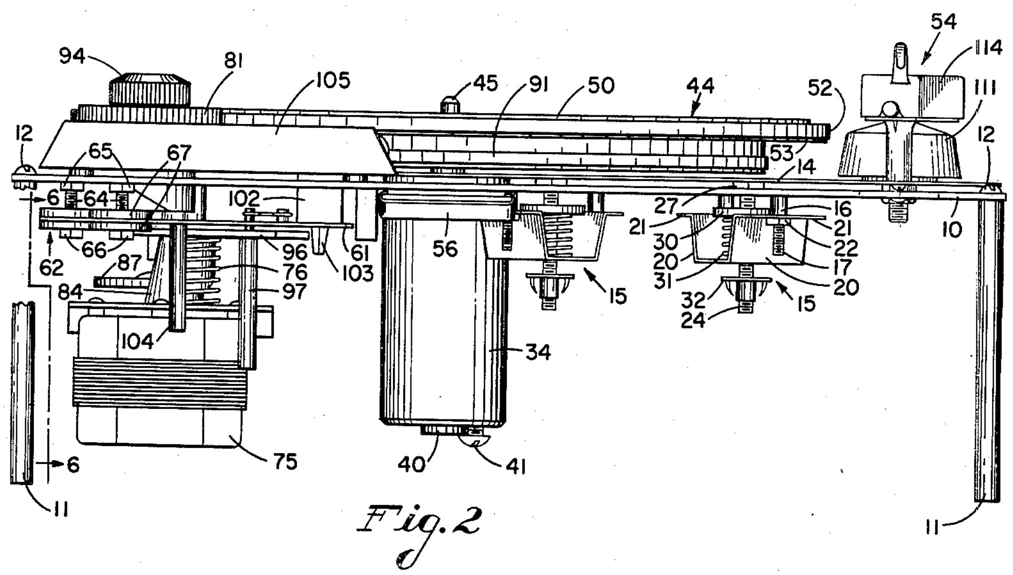
FIG. 2 is a side elevation thereof.

The variable speed drive assembly for the turntable is mounted on a rectangular plate 61 that is suspended below the chassis 10 on three cushioned mounts 62 (FIGS. 2 and 4). Each of these mounts 62 has a machine screw 64 that is mounted to project downwardly from the chassis 10 with its head resting on the upper surface of the chassis 10. A nut 65 is threaded on the screw 64 and up against the bottom of the chassis 10, to hold the downwardly projecting shanks of the screws 64 rigid relative to the chassis 10. Each screw 64 projects through one of three respective openings in the drive assembly mounting plate 61, and a nut 66 is threaded on the lower end of each of the screws 64. Resilient rubber washers 67 are mounted around the screws 64 on each side of the plate 61, to cushion the drive assembly mounting plate and to isolate it from vibration.

A guide bushing 70 (FIG. 5) is secured at its upper end to the plate 61 to depend downwardly therefrom. A shaft 71 is mounted for radial and axial movement in the bore of the bushing 70. An upstruck portion 72 of a motor mounting plate 74 is secured to the lower end of the rod 71 by a screw 73. An electric motor 75 is secured to the lower surface of the plate 74. A coil spring 76 is disposed around the guide bushing 70 and has an extended upper end that is secured by a screw 77 to the drive assembly mounting plate 61, and that has an extended lower end that is secured by a screw 80 to the motor mounting plate 74. The weight of the motor 75 is carried by the coil spring 76, which constantly urges the motor 75, the motor mounting plate 74, and the pin 71 in an upward direction and in a clockwise direction relative to FIG. 4. A rotatable cam member 81, having a spiral cam face 82, is mounted for rotation on the upper face of the plate 61. The spiral cam face 82 engages against the curved upper end of the rod 71. To lower the motor 75, the cam member 81 is rotated in one direction, clockwise relative to FIG. 4, to press down the shaft 71 and to stretch the spring 76. To raise the motor, the cam member 81 is rotated in the opposite direction, to permit the spring 76 to contract to raise the motor 75 and to press the shaft 71 up against the cam face 82.

To transmit the rotation of the motor to the turntable, a conical member 84 is secured to the armature shaft of the motor 75 for rotation when the motor is operated. A shaft 85 (FIGS. 6 and 7) is rotatably journaled in a bearing 86 that is secured to the plate 61. A resilient rubber friction gear or pulley wheel 87 is secured to the lower end of the shaft 85. The periphery of the wheel 87 is disposed to be engaged by a portion of the peripheral surface of the conical member 84, in the driving position of the variable drive assembly (FIG. 6). A pulley 90 is secured to the upper end of the shaft 85. A resilient, flexible belt 91 is passed around the pulley 90 and the flange 51 of the turntable, to transmit rotary movement from the pulley 90 to the turntable. Although a variety of different types of resilient, flexible belts are suitable for use to drive the turntable, we prefer to employ, for optimum performance, a fabric-reinforced belt of a synthetic plastic material, that is characterized by limited resilience by reason of the presence of the fabric.

A crank arrangement is provided for moving angularly the shaft 71 and with it the motor 75, to move the conical member 84 into and out of engagement with the wheel 87 respectively. A shaft 92 (FIG. 7) is rotatably journalled in an opening in the drive assembly mounting plate 61 and projects upwardly therefrom through a bore in the cam member 81, coaxially therewith. A knurled knob 94 is secured to the upper end of the shaft 92 by a set screw 95, that secures the knob 94 to the shaft 92 for rotation with the shaft, free of engagement with the cam member 81. The shaft 92 is formed with a reduced lower end portion to provide a shoulder that rides on the upper surface of drive assembly mounting plate 61; and this lower end portion projects through an opening in the plate 61. A crank arm 96 is secured to the projecting lower end of the shaft 92, for rotation with the shaft. A pin 97 is secured to the outer end of the arm 96, and depends downwardly therefrom a sufficient distance to be engageable against one side of the motor mounting plate 74. The pin 97 has a reduced upper end 98 that projects through a slot 99 (FIG. 4) in the plate 61. One end of a wire spring 100 is pivotally connected to the reduced shaft end 98, and the other end of the spring 100 is pivotally connected to a pin 101 that is secured to the plate 61.

An electric switch box 102 is mounted on the upper surface of the plate 61 with its switch arm 103 (FIGS. 2 and 6) projecting downwardly through a hole in the plate 61. To close this switch, as in FIG. 7, the knob 94 is rotated counter-clockwise relative to FIG. 4, to turn the crank arm 96 in a counter-clockwise direction to engage the switch arm 103 and press it up into the switch box 102 to open the switch and shut off the motor. The reduced end 98 of the pin 97 engages against the end of the slot 99, to limit the angular movement of the crank arm 96. As the reduced end 98 of the pin is moved in this manner, the spring 100 is expanded to hold the pin end 98 in its limit position, at one end of the slot 99. As the knob 94 is rotated and the crank arm 96 is turned counter-clockwise, the pin 97 engages against the motor mounting plate 74 and pivots it about the shaft 71, to move the conical drive member 84 out of contact with the friction wheel 87. Pivotal movement of the motor mounting plate 74 is limited by a pin 104 that depends downwardly from the drive assembly mounting plate 61.

A cover 105 is secured to the upper surface of the chassis 10 by screws 106. The cover 105 is formed with an aperture through which the cam member 81 projects. A pointer 107 is scribed on the upper face of the cam member 81, and cooperating numerical indicia 108, corresponding to desired speeds of turntable rotation, are disposed on the upper face of the cover 105, to permit rough adjustment of the cam member 81 to positions corresponding to those speeds, respectively, as will now be described in greater detail.

To turn on the motor and operate the turntable, the knob 94 is rotated in a clockwise direction relative to FIG. 4, to rotate the crank arm 96 in a clockwise direction to permit the switch arm 103 to emerge from the switch box 102, to close the switch and turn on the motor. Rotary movement of the knob 94 is continued until the reduced end 98 of the pin 97 is carried to the end of the slot 99 as shown in FIG. 4, to compress the spring 100, which locks the pin end 98 at that end of the slot 99. As the pin 97 is moved in a clockwise direction relative to FIG. 4, the coil spring 76 is permitted to expand to cause the motor mounting plate 74 and the motor 75 to pivot to move the shaft 71 angularly within the guide bushing 70, until the conical member 84 engages against the peripheral surface of the wheel 87. The motor 75 is inclined slightly so that the surface of the conical member 84 is always parallel to the peripheral surface of the drive pulley 87, as the motor is moved up and down.

To adjust the speed at which the turntable is driven, the cam member 81 is rotated, roughly to align the pointer 107 on the cam member with indicia 108 on the surface of the cover 105, that indicates a desired turntable speed, such as, for example, 78 r.p.m. The stroboscopic lamp 60 is wired so that when the motor is running, the lamp is energized. The reflection of the dots **57*a* in the mirror 56 is observed to determine if the turntable is running at the desired speed. If the turntable is at exactly 78 r.p.m., the dots 57*a* will appear to be stationary under the stroboscopic light. If the dots appear to be moving in a clockwise direction, the turntable is moving at a speed above 78 r.p.m. To correct this, the cam member 81 is rotated in a clockwise direction until the dots 57*a* appear to stand still. When the cam member 81 is rotated clockwise, the spiral cam face 82 forces the shaft 71 down, thereby also forcing down the motor mounting plate 74, and with it, the motor 75 and the conical member 84. As the conical member 84 drops down, the spiral spring 76 maintains contact between it and the drive pulley 87. When the conical member 84 drops down, the drive pulley 87 engages against a portion of the conical member 84 of smaller diameter and hence, a portion that is rotating at a lower surface speed. The pulley 87 is therefore rotated at a slower speed, thereby slowing the pulley 90 and the drive belt 91, and slowing down the turntable. When the cam member 81 is rotated in a counter-clockwise direction, the reverse occurs, so that the conical member 84 is raised, to engage the drive pulley 87 against a rotating portion that has a higher surface speed, thereby causing the drive pulley 87** to rotate at a higher speed and transmitting the higher speed to the turntable.

Similarly, to operate the turntable at other rates of speed, the cam member 81 is rotated to align the pointer 107 with the appropriate indicia 108 on the cover 105, and thereafter, further fine adjustments can be made as necessary to rotate the turntable at the precise speed desired. With a little experience in the operation of the variable speed drive and the stroboscopic timer, the operator can readily adjust the drive to rotate the turntable at speeds that are slower or faster than a standard speed, by any desired amount.

In the engineering of many high fidelity turntables, hysteresis motors often have been considered necessary to avoid flutter, since ordinary electric motors have a plurality of slots in the rotor, and every time a slot goes by a pole, a pulse is produced. When these pulses are transmitted to the turntable, flutter occurs. In my turntable assembly, the elastic belt acts in a sense as a vibration filter, since the elasticity of the belt absorbs any motor pulses that are transmitted through the drive mechanism to the belt. Furthermore, additional filtering is obtained from the flywheel action of the turntable, due to its large mass, that is concentrated in the rim. I have found that I can use a conventional shaded pole motor and still obtain performance that is free from flutter and that is equal to or superior to the performance that would be obtained by using a hysteresis motor.

Another advantage of my turntable assembly is that the cartridge element of the tone arm is mounted as far from the motor as practicable, consistent with reasonable table size. This eliminates the undesirable effects that are observed when the magnetic field of the electric motor is too close to the cartridge element.

My turntable suspension isolates the tone arm from outside vibrations and facilitates tracking even with low frequency external vibrations. It is therefore characterized by an excellent ratio of signal to noise.

While many standard tone arms can be used in my apparatus, I prefer to employ a tone arm 54 that is supported on a shaft 110 that in turn is pivotally supported on a pointed rod (FIG. 3) that is secured to the turntable and tone arm mounting plate 14. The shaft 110 is formed with a skirt 111 that conceals a viscous-damping arrangement, comprising a smaller, concentric skirt that projects downwardly into a small container of a viscous damping fluid such as, for example, a silicone oil. An arm 112 is secured to the shaft 110. A cartridge holding head 114 is secured to one end of the arm 112, and a balancing weight 115 is secured to the opposite end of the arm 112. The balancing weight 115 is mounted for rotation about the arm 112 and its center of gravity is eccentric thereto. This permits the weight 115 to be adjusted to balance the arm 112 about its pivot point both as to lengthwise and as to transverse weight balance.

While the invention has been described in connecticon with a specific embodiment thereof, it will be understood that it is capable of further modification, and this application is intended to cover any variations uses, or adaptations following, in general, the principles of the invention and including such departures from the present disclosure as come within known or customary practice in the art to which the invention pertains and as may be applied to the essential features hereinbefore set forth, and as fall within the scope of the invention or the limits of the appended claims.

Having thus described my invention, what I claim is:

1. A turntable assembly for a sound reproduction system comprising a chassis, a turntable and tone arm mounting plate mounted horizontally on said chassis, adjustable spring means interposed between said chassis and said mounting plate and supporting the entire weight of said plate from said chassis, for resiliently spacing said mounting plate from said chassis to isolate vibrations therebetween, said adjustable spring means including leveling means for adjusting the elevation of said plate relative to said chassis, bearing means mounted on said mounting plate, a turntable journaled in said bearing means for rotation relative to said mounting plate, and drive means fixed to said chassis including a flexible resilient endless drive member disposed about said drive means and said turntable for rotating said turntable, said drive means further including a motor, and spring biasing means for resiliently supporting said motor to said chassis.

2. A turntable assembly for a sound reproduction system comprising a chassis, a turntable and tone arm mounting plate mounted horizontally on said chassis, adjustable spring means interposed between said mounting plate and said chassis and supporting the entire weight of said plate from said chassis, to isolate vibrations therebetween, said adjustable spring means including leveling means for adjusting the elevation of said plate relative to said chassis, a turntable mounted from said plate for rotation relative to said plate, a motor, resilient means interposed between said motor and said chassis to support the weight of said motor therefrom and to isolate vibrations therebetween, variable speed drive means operable by said motor, said resilient means including a spring urging said motor towards said variable drive means and said variable speed drive means including a flexible, resilient element interconnecting said drive means and said turntable for rotating said turntable.

3. A turntable assembly for a sound reproduction system comprising a chassis, a drive assembly mounting plate disposed in spaced relation to said chassis, cushion means interposed between said plate and said chassis to support said plate therefrom and to isolate vibrations therebetween, an electric motor suspended from said plate, said cushion means including a spring resiliently urging said plate to move in a given direction, a turntable and tone arm mounting plate mounted on said chassis, adjustable spring means interposed between said last-named plate and said chassis and supporting the entire weight thereof from said chassis to isolate vibrations therebetween, said adjustable spring means including leveling means for adjusting the elevation of said last-named plate, a turntable mounted from said last-named plate for rotation relative thereto and drive means for resiliently coupling the armature shaft of said motor to said turntable for rotating said turntable, said drive means including a flexible resilient endless drive means interconnecting said drive means and said turntable.

4. A turntable assembly for a sound reproduction system comprising a chassis, an electric motor, resilient means interposed between said motor and said chassis to isolate vibrations therebetween, a rotatable member of varying diameter adapted to be driven by the armature shaft of said motor, means to move said member through a predetermined path, a mounting plate for a turntable and tone arm mounted horizontally on said chassis, adjustable spring means interposed between said plate and said chassis to support the entire weight of said plate and to isolate vibrations therebetween, said adjustable spring means including leveling means for adjusting the elevation of said plate relative to said chassis, a turntable mounted from said plate for rotation relative to said chassis, contact means adapted to engage against peripheral portions of said member of different diameters respectively for rotation upon rotation of said member, and means including a flexible resilient endless drive member disposed about said turntable and said contact means for resiliently driving said turntable to rotate said turntable at a speed that is proportional to the diameter of said engaged portion for resiliently driving said turntable to rotate said turntable at a speed that is porportional to the diameter of said engaged portion said resilient means including a biasing spring urging said motor towards said contact means.

5. A turntable assembly for a sound reproduction system comprising a chassis, an electric motor resiliently mounted for movement relative to said chassis, resilient means interposed between said motor and said chassis to isolate vibrations therebetween, means to move said motor through a predetermined path, a member of varying diameter secured to the armature shaft of said motor, a mounting plate for a turntable and tone arm mounted on said chassis, adjustable spring means interposed between said plate and said chassis to support the entire weight of said plate to isolate vibrations therebetween, said adjustable spring means including leveling means for adjusting the elevation of said plate relative to said chassis, a turntable mounted from said plate for rotation relative to said chassis, and means adapted to engage against peripheral portions of said member of different diameters respectively for rotation upon rotation of said member, and means operable upon rotation of said contact means for resiliently driving said turntable to rotate said turntable at a speed corresponding to the diameter of said engaged portion.

6. A turntable assembly for a sound reproduction system comprising a chassis, an electric motor, resilient means interposed between said motor and said chassis to isolate vibrations therebetween, a member of varying diameter secured to the armature shaft of said motor, means to move said member through a predetermined path, a turntable mounted for rotation relative to said chassis, adjustable resilient means interposed between said turntable and said chassis to isolate vibrations therebetween, said adjustable resilient means including leveling means for adjusting the elevation of said turntable relative to said chassis, contact means adapted to engage against peripheral portions of said member of different diameters respectively for rotation upon rotation of said member, means operable upon rotation of said contact means for resiliently driving said turntable to rotate said turntable at a speed corresponding to the diameter of said engaged portion, and means for indicating speed of rotation of said turntable to permit operation thereof at a desired speed by adjustment of the position of said member in its said path.

7. A motor-powered variable speed drive assembly that is adapted to drive a rotary member substantially free of vibrations originating in said motor comprising a drive assembly mounting plate, a support member mounted for movement in a predetermined path relative to said plate, spring means interposed between said support member and said plate constantly to urge said support member in one direction, an electric motor secured to said support member for movement upon movement of said support member, movable means mounted to move said support member and motor in one direction in opposition to said spring upon movement of said movable means in a given direction and to permit said spring to move said support member and motor in the opposite direction upon movement of said movable means in the direction opposite to said given direction, a drive member of varying diameter secured to the armature shaft of said motor for rotation upon rotation of said shaft, a contact member adapted to be driven by said drive member and mounted for engagement against portions of the peripheral surface of said drive member of different diameters respectively to be rotated upon rotation of said drive member at a speed dependent upon the diameter of said engaged portion, a rotary member that is mounted to be isolated from vibrations from said drive assembly, drivable means mounted for driven rotation upon rotation of said contact means, and an elastic belt resiliently interposed between said drivable means and said rotary member to drive said rotary member upon rotation of said drivable means.

8. A turntable assembly for a sound reproduction system comprising a chassis, a turntable and tone arm mounting plate, adjustable spring means interposed between said turntable and tone arm mounting plate and said chassis and supporting the entire weight of said plate from said chassis, resiliently to space said turntable and tone arm mounting plate from said chassis and to isolate vibrations therebetween, means for adjusting said spring means to adjust the elevation of said last-named plate, bearing means mounted on said turntable and tone arm mounting plate, a turntable journaled in said bearing means for rotation relative to said chassis, and a variable speed drive for rotating said turntable and comprising a drive assembly mounting plate disposed in spaced relation to said chassis, cushion means interposed between said drive assembly mounting plate and said chassis to damp vibrations therebetween, a support member mounted for movement in a predetermined path relative to said drive assembly mounting plate, spring means interposed between said support member and said drive assembly mounting plate constantly to urge said support member in one direction along said path, an electric motor secured to said support member for movement with said support member as a unit, movable means mounted to move said support member in one direction in opposition to said spring upon movement of said movable means in a given direction and to permit said spring to move said support member in the opposite direction upon movement of said movable means in the direction opposite to said given direction, a drive member of variable diameter secured to the armature shaft of said motor for rotation upon rotation of said shaft, a member adapted to be driven by said drive member and mounted for engagement against portions of the peripheral surface of said drive member of different diameters respectively to be rotated upon rotation of said drive member at a speed dependent upon the diameter of said engaged portion at a given motor speed, and means for resiliently connecting said driven member to said turntable for rotating said turntable.

9. The turntable assembly defined in claim 1 wherein said spring biasing means includes a spring urging said motor to move in a circular path and in a direction substantially normal to said circular path.

References Cited in the file of this patent

UNITED STATES PATENTS

| | | |
|---|---|---|
| 1,811,410 | Watts | June 23, 1931 |
| 1,820,154 | Peets | Aug. 25, 1931 |
| 1,975,907 | Strauss | Oct. 9, 1934 |
| 2,254,844 | Guedon | Sept. 2, 1941 |
| 2,353,763 | Rodman | July 18, 1944 |
| 2,486,661 | Leitner | Nov. 1, 1949 |
| 2,777,902 | Goldmark | Jan. 15, 1957 |
| 2,826,925 | Singer | Mar. 18, 1958 |
| 2,847,593 | Selbach et al. | Aug. 12, 1958 |
| 2,876,648 | Hartman | Mar. 10, 1959 |

FOREIGN PATENTS

| | | |
|---|---|---|
| 770,577 | France | Sept. 17, 1934 |
| 949,817 | France | Sept. 9, 1949 |
| 500,650 | Belgium | July 16, 1951 |
| 1,033,863 | France | July 16, 1953 |
| 757,378 | Great Britain | Sept. 19, 1956 |